United States Patent [19]
Penn

[11] 3,897,995
[45] Aug. 5, 1975

[54] METHOD AND APPARATUS FOR PERFORMING HOLOGRAPHIC INTERFEROMETRY

[75] Inventor: Robert C. Penn, Ann Arbor, Mich.

[73] Assignee: GCO, Inc., Ann Arbor, Mich.

[22] Filed: Nov. 1, 1973

[21] Appl. No.: 411,656

[52] U.S. Cl. .............................. 350/3.5; 356/106 R
[51] Int. Cl. ........................................... G02b 27/00
[58] Field of Search ................. 350/3.5; 356/106 R

[56] References Cited
UNITED STATES PATENTS

| | | | |
|---|---|---|---|
| 3,522,979 | 8/1970 | Wuerker | 350/3.5 |
| 3,563,652 | 2/1971 | Powell et al. | 350/3.5 X |
| 3,635,539 | 1/1972 | McMahon | 350/3.5 |
| 3,799,642 | 3/1974 | Phillips et al. | 350/3.5 |

*Primary Examiner*—Archie R. Borchelt
*Attorney, Agent, or Firm*—Krass & Young

[57] ABSTRACT

To perform holographic interferometric analysis of the deformation of a relatively small section of a larger surface, the section is first painted with retro-reflective paint and a photographic plate is supported parallel to and closely spaced from said section. The light beam from a laser is passed through a diverging lens onto the photographic plate to illuminate the section, thereby exposing the photographic plate to direct illumination from the beam and to reflected radiation from the section. The laser is energized for a short time to expose the plate and the member is then loaded to deform the surface. After the loading the laser is again energized to make a second exposure on the plate. After development of the plate the plate is illuminated with an intense source of light to reconstruct wave-fronts representing an image of the section having fringe lines superimposed thereon and arrayed as a function of the deformation of the member between the two exposures.

12 Claims, 5 Drawing Figures

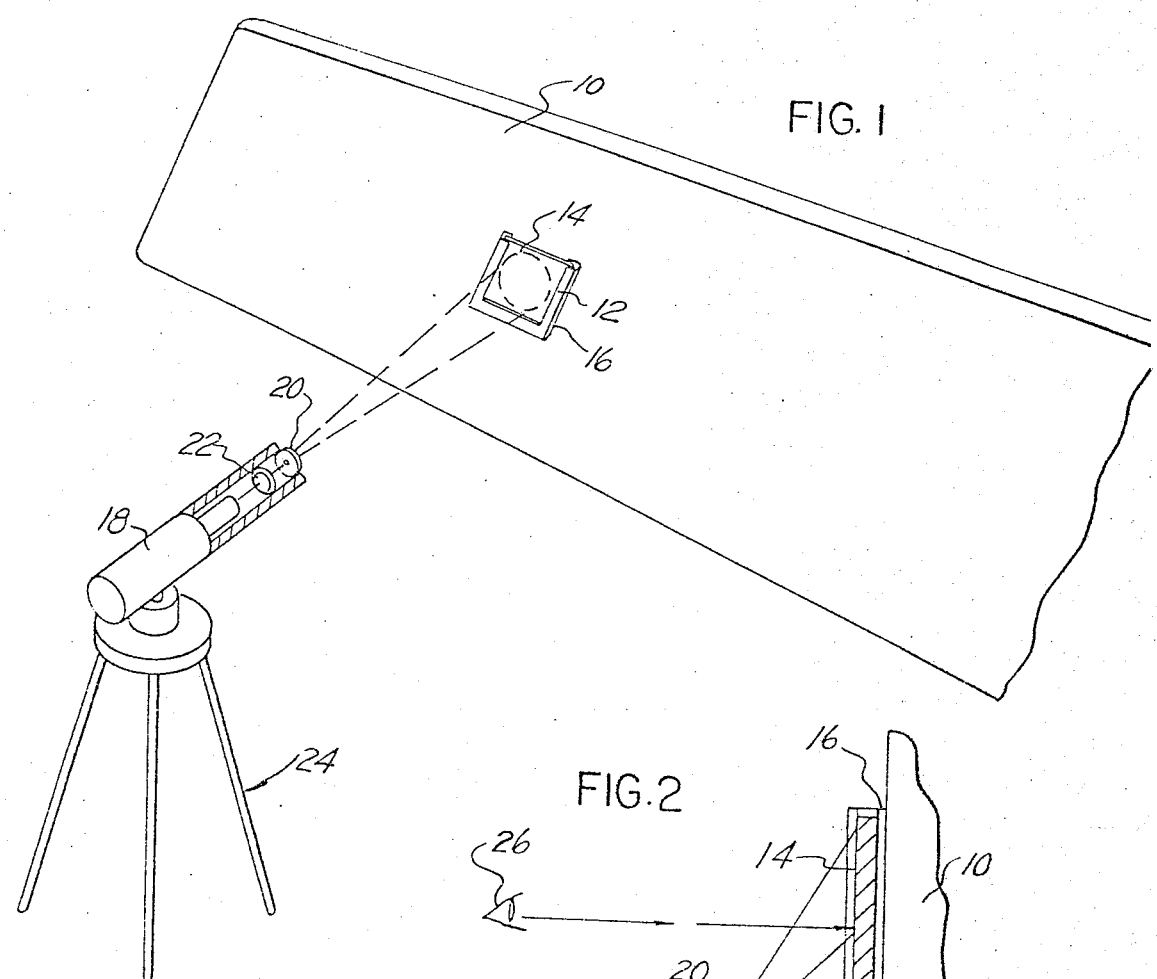
FIG. 1
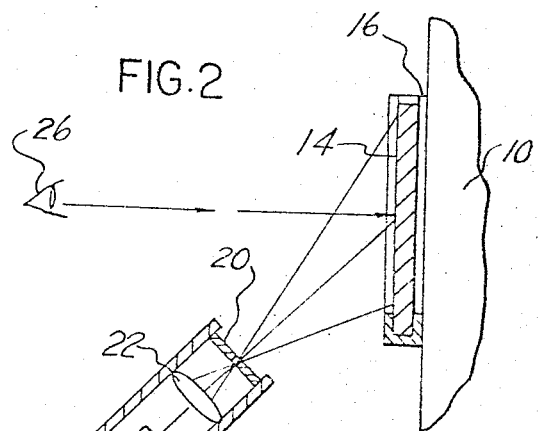
FIG. 2
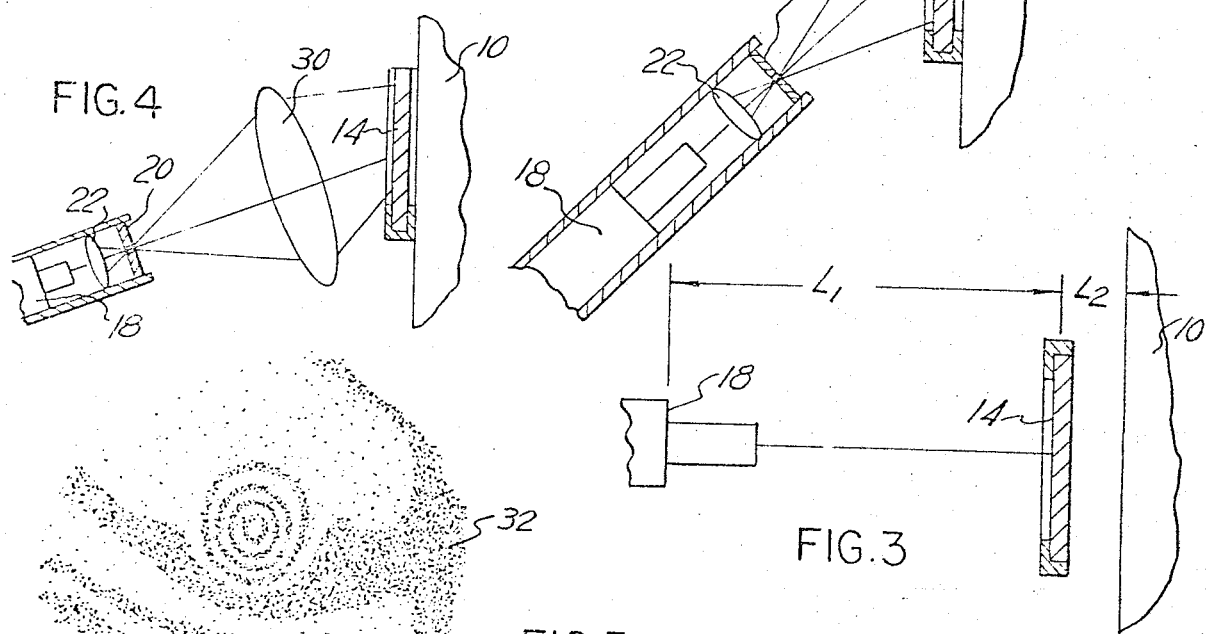
FIG. 4
FIG. 3
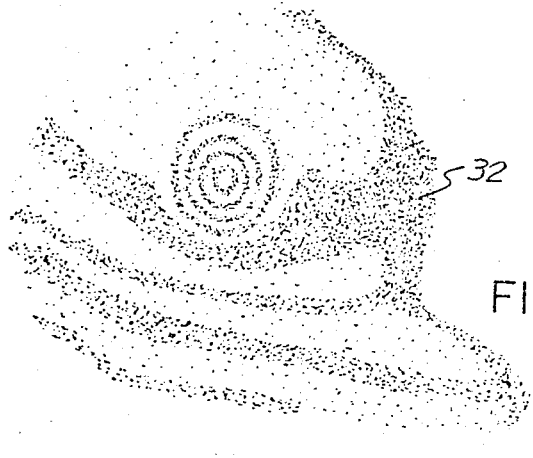
FIG. 5

METHOD AND APPARATUS FOR PERFORMING HOLOGRAPHIC INTERFEROMETRY

BACKGROUND OF THE INVENTION

1. Field of the Invention

This invention relates to method and apparatus for forming holograms of a section of a body and for performing holographic interferometric analysis of the deformation of the section of the body between two times using a photographic plate supported on the body to eliminate the problem of motion between the photographic plate and the body during and between exposures of the plate.

2. Prior Art

Holograms are formed by photographically recording the interference pattern between light reflected from a body illuminated from a coherent source, usually a laser, and a reference beam of light derived directly from the laser. Any motion between the object and the photograph media during the exposure of at least the same order of magnitude as the wavelength of the coherent light will result in degradation in the resulting hologram. Holographic interferometry involves the coherent superimposition of a wave-front reconstructed from a hologram and representing the surface of an object at a first time, with a second set of wave-fronts representing the object at a second time, after it has been deformed, as by loading. The second set of wave-fronts may be derived from a second hologram, using a "double exposure" technique or may occur in "real time" as a result of illumination of the surface section with coherent light at the second time. In either technique deformation of the object surface between the two times results in interference between the two sets of wave-fronts creating a family of fringe lines on the resulting image which map the deformation pattern.

Motion of the object relative to the photographic media during either the first or second exposures or during the real time viewing will result in distortions of the hologram and/or the fringe families. Also, overall motion of the object relative to the photographic media between the two exposures employed in the double exposure technique will result in fringe families which do not truly reflect deformation of the object section.

Elaborate and expensive systems have been developed to prevent motion between the elements of a holographic system. In particular both the object and photographic plate have been supported on massive, rigid tables which are in turn mounted on vibration isolating suspension systems. However, holography in general and holographic interferometry in particular have not been previously used in connection with larger objects such as large machines or aircraft wings or the like which cannot be supported on a vibration isolated table.

SUMMARY OF THE INVENTION

The present invention is directed to a method and apparatus for forming holograms and performing holographic interferometry which may be used with large objects such as machines, vehicles and building structures.

Broadly the method of the present invention involves retaining a photographic plate in closely spaced parallel relationship to a section of the member to be analyzed by mounting the plate on portions of the member surrounding that section. A hologram is then formed by illuminating the section with coherent light which has passed through the photographic plate. One side of the photographic plate is thus exposed to the direct coherent light, which acts as a reference beam, and the other side of the plate is exposed to light reflected from the section of the object under scrutiny. The photographic plate records the interference between these two beams which are disposed in approximately 180° opposition to one another. When the plate is developed a hologram is formed wherein interference patterns are recorded in the thickness of the media. The media may then be illuminated with normal white light from an intense source, in a manner of a "white light" hologram, to reconstruct the wave-fronts previously reflected from the object or, in the case of a double exposure hologram to reconstruct wave-fronts reflected from the object at two separated times to produce an image of the section containing fringes related to the deformation of the surface between the times of the two exposures.

Any vibrations induced in the overall object during the formation of these holograms or any overall motion of the object between the two exposures in the double exposure arrangement do not affect the resulting holograms as the photographic plate is supported so that it undergoes the same overall motion as the object.

Since motion of the photographic plate-object set relative to the coherent source alters both the object beam and reference beam by equal amounts the hologram is insensitive to these motions and the interference fringes formed at the photographic emulsion are dependent only on the distance between the object and the emulsion.

In a preferred embodiment of the invention which will subsequently be disclosed in detail a section of the object to be analyzed is first painted with a retroreflective coating. Alternatively, the coating may be applied as a tape. The retroreflective coating is not essential to the practice of the method of the present invention but subsequently enhances the results achieved. The coating is used only with a diffusely reflecting surface and is not needed with a polished surface. The retro-reflective coating tends to minimize the scattering angle of the light reflected from the object; this in turn causes the reconstructed beam to be relatively concentrated, producing a high intensity of reconstruction and interference with the second wavefront sets.

The coherent illumination of the photographic plate and the object may be divergent, collimated or convergent. Since the light beam from the laser must be diverged to a relatively large cross-sectional area before it may be collimated or converged, the use of a diverging beam is the simplest technique in terms of equipment required. In the preferred embodiment a special filter consisting of a pinhole aperture and a diverging lens are supported on the laser itself. The use of a relatively large collimating lens between the spacial filter and the photograph plate maintains a relatively constant illumination direction independent of shifts in object-plate position and hence allows good fringes to be obtained in holographic interferometry over deformation distances greater than those which would be achievable using diverging illumination. When a diverging illumination is used, resulting in a converging reconstructed beam, it may be necessary to view the hologram from some small volume of space on reconstruction to see the image and fringe pattern.

Because of the close spacing between the photographic plate and the object surface being analyzed the laser does not require a high coherent length. The physical arrangement also directs the photographic plate into the which passes through the photographic plate into the object beam and therefore relatively short exposure times may be used even with a low powered laser.

The present invention therefore allows holography and holographic interferometry to be performed without the need for elaborate vibration isolation systems. This results in simple equipment with low initial and maintenance cost which can be used with a minimum of training in optics. In addition, holographic interferometry can be performed on equipment that is too large to be supported on a vibration isolation table and on equipment that are actually in operation.

Other objectives, advantages and applications of the present invention will be made apparent by the following detailed description of a preferred embodiment of the invention. The description makes reference to the accompanying drawings in which:

FIG. 1 is a perspective view illustrating the apparatus used in the practice in the method of the present invention to analyze deformation in a section of an airplane wing employing a diverging light beam;

FIG. 2 is a schematic view illustrating the apparatus of the present invention and the method of viewing the reconstructed wave-fronts from a hologram formed in accordance with the present invention.

FIG. 3 is a diagram illustrating the geometric relationship between the components employed in the practice of the present invention;

FIG. 4 is a diagram illustrating the use of a converging illumination beam; and

FIG. 5 is a illustration of the interference fringes obtained by the practice of holographic interferometry employing the present invention.

Referring to FIG. 1 the method and apparatus of the present invention may be used to form a hologram of the section of the surface of an aircraft wing, 10, or perform a holographic interferometric analysis of the deformation which that section undergoes as a result of loading of the wing. Assuming the wing section is attached to an aircraft it would be virtually impossible to mount the aircraft to fully isolate it from vibration so the conventional methods and apparatus for forming holograms or practicing holographic interferometry cannot be used with the wing.

In the practice of the present invention a photographic plate holder, 12, having an area slightly larger than the area of the wing section to be analyzed is supported in close spaced relation to the wing section. The plate holder 12 is preferably fixed to the wing so that a plate 14 supported within the holder is substantially parallel to and spaced from the wing surface to be examined by approximately 0.2 inches. The plate holder 12 is supported at points surrounding section of the wings to be analyzed by a number of spacers 16 arranged at the edges of the plate and adhesively attached to the wing surface. Alternatively, the plate holder 12 could be supported at a single point or along a line in a cantilever manner. The plate 14 may be of the conventional photographic type recommended by the various manufacturers. Alternatively, the plate 14 might be photochromic or otherwise sensitive to the form of radiation employed.

The light source used in the formation of a hologram constitutes a laser 18 which may have a 2 milliwatt power output. The laser is equipped with and supports a spacial filter consisting of a pinhole 20 and a diverging lens 22 fixed in the path of its output beam. The laser may be supported on a tripod 24. The laser is preferably arrayed so that its diverging beam makes an angle of approximately 10°–15° with the photographic plate 14 supported in the plate holder 12.

After a photographic plate 14 is disposed in the holder 12 it is unmasked in darkness and then the laser 18 is powered for a short period of time, such as 1 second. The wing section 10 may then be loaded in some suitable manner as by placing weights on it or changing its temperature. Another exposure of the photographic plate 14 is then made after the loading. The plate is then ready for conventional development to form a double exposure hologram.

FIG. 2 schematically illustrates the manner in which a hologram is formed using the apparatus of FIG. 1. The laser 18 produces a beam which is projected at an angle on one side of the photographic plate 14, and acts as a reference beam. Some portion of the light passes through the photographic plate, hits the section of the wing 10 beneath the plate and is reflected back to the plate. This reflected light coherently interferes with the reference beam and the interference patterns are recorded in the thickness of the photographic plate.

After development of the plate it may be illuminated by either coherent light from the laser or from an intense incandscent source such as a microscope light, disposed in generally the same attitude as was the laser 18 during the formation of the hologram. An eye 26 viewing through the suitably illuminated hologram will see an image of the wing section containing interference fringes which are arrayed as a function of the deformation of that section, relative to the plate 14, and also the wing section supporting the plate, as a result of the loading.

The clarity of the resulting fringes are enhanced if the wing section is coated prior to the analysis with a retroreflective paint such as "CODIT," the trademark for a product manufactured by the 3M Company of St. Paul, Minnesota. This paint contains small beads which reflect incident light in the direction of its source. The material is also available as a tape. Alternatively, the wing could be painted with a simple reflective paint.

FIG. 3 illustrates the independence of the resulting holograms or the holographic interferograms from motion between the light source 18 and the combination of the photographic plate 14 and the object 10. The distance from the light source 18 to the plate 16 is designated $L_1$ and the distance from the plate to the wing surface is $L_2$. The length of the reference beam is $L_1$; the length of the object beam is $L_1 + 2L_2$. The interference between the two is a function of $(L_1 + 2L_2) - L_1 = 2L_2$. A relative motion between the source 18 and the plate-object set changes both the object beam and the reference beam length by the same amount and accordingly the resulting interference pattern is not affected.

A variation on the apparatus of FIGS. 1 and 2 wherein a converging illumination beam is employed is illustrated in FIG. 4. The laser 18 is equipped with a pinhole aperture 20 and an objective lens 22 which produces a relatively widely diverging light beam. This beam is intersected by a large double convex field lens 30 causing the beam to converge and intersect the photographic plate 14 supported in close spaced relationship to the test surface 10. The field lens could also be arranged to produce a collimated beam which might be useful under certain circumstances such as, transverse object motion or rotation.

FIG. 5 illustrates a representative set of interference fringes 32 produced when a double exposure hologram formed in accordance with the present invention is illuminated or when the wave-fronts from a single exposure hologram of the test section are coherently interfered with light waves reflected from the section. These interference fringes are identical to those produced in the normal practice of holographic interferometry and map the deformation of the surface 10 relative to the photographic plate 14 between the times of generation of the two wave-fronts.

Having thus described my invention, I claim:

1. The method of forming a hologram of a section of the surface of a member comprising: supporting a radiation sensitive recording media on said member by means of a support fixed to said member externally of the section so that a portion of said media extends in close spaced relation to said section; illuminating said section with coherent radiation passed through said media so that said media is exposed to and records the interference pattern created by direct coherent radiation and coherent radiation reflected from said surface section.

2. The method of claim 1 wherein said section of the surface has a generally planar extension, the radiation sensitive media has a generally planar extension and the media is supported in generally parallel relationship to said planar section.

3. The method of claim 1 wherein the radiation sensitive media is supported by a plurality of support members fixed to the member at spaced points arrayed about said section of the member.

4. The method of claim 1 wherein the radiation sensitive media consists of a photographic emulsion formed on a transparent support member.

5. The method of claim 4 wherein said support member consists of a glass plate.

6. The method of claim 1 including the step of coating said surface section with a retro-reflective material.

7. The method of claim 1 wherein the radiation sensitive media is photochromic.

8. The method of recording and reconstructing the wave-fronts reflected from a section of a surface of a body illuminated with light from a laser, comprising: supporting a light sensitive recording media on a plurality of support members fixed to the member about said section so that a portion of said media is supported in spaced relationship to said section of the surface; illuminating said section of the surface with light derived from a laser and passed through said media so that said media is exposed to light from the laser and light reflected from said section; developing the media to form a hologram; and illuminating the hologram with light from a source less coherent than the laser to reconstruct the wave-fronts reflected from the surface.

9. The method of claim 8 wherein said surface section has a generally planar disposition and the radiation sensitive media is supported parallel to said surface section.

10. The method of analyzing the deformation of a section of the surface of a member between first and second times, comprising: supporting a radiation sensitive recording media on said member at points external of said section so that a portion of said media extends in spaced relationship to said section; illuminating said section with coherent radiation passed through said media so that said media is exposed to said coherent radiation and radiation reflected from said section; reconstructing the wave-fronts from said hologram with a radiation source; coherently superimposing the wave-fronts reconstructed from said hologram with wave-fronts reflected from said section at a second time, while it is illuminated with coherent radiation.

11. The method of claim 10 wherein second wave-fronts are derived from a second hologram formed on said radiation sensitive media by exposing said media to coherent radiation reflected from said surface section and directly from the source at said second time.

12. The method of claim 10 wherein said second wave-fronts are created in real time by illumination of said section with coherent radiation.

* * * * *

UNITED STATES PATENT OFFICE
CERTIFICATE OF CORRECTION

Patent No. 3,897,995　　　　　　　　　Dated August 5, 1975

Inventor(s) Robert C. Penn

It is certified that error appears in the above-identified patent and that said Letters Patent are hereby corrected as shown below:

Column 2, line 56 "special" should read --spacial--.

Signed and Sealed this twenty-fifth Day of November 1975

[SEAL]

Attest:

RUTH C. MASON  
*Attesting Officer*

C. MARSHALL DANN  
*Commissioner of Patents and Trademarks*